US009818330B2

(12) United States Patent
Huang et al.

(10) Patent No.: US 9,818,330 B2
(45) Date of Patent: Nov. 14, 2017

(54) DISPLAY APPARATUS

(71) Applicant: InnoLux Corporation, Miao-Li County (TW)

(72) Inventors: Sheng-Feng Huang, Miao-Li County (TW); Chien-Feng Shih, Miao-Li County (TW); Gerben Johan Hekstra, Miao-Li County (TW)

(73) Assignee: INNOLUX CORPORATION, Miao-Li (TW)

( * ) Notice: Subject to any disclaimer, the term of this patent is extended or adjusted under 35 U.S.C. 154(b) by 112 days.

(21) Appl. No.: 14/943,430

(22) Filed: Nov. 17, 2015

(65) Prior Publication Data

US 2016/0150663 A1 May 26, 2016

Related U.S. Application Data

(60) Provisional application No. 62/082,672, filed on Nov. 21, 2014.

(30) Foreign Application Priority Data

Feb. 17, 2015 (TW) ............................ 104105517 A

(51) Int. Cl.
*G02F 1/1345* (2006.01)
*G09G 3/20* (2006.01)

(52) U.S. Cl.
CPC ....... *G09G 3/20* (2013.01); *G09G 2300/0408* (2013.01); *G09G 2300/0426* (2013.01); *G09G 2310/0281* (2013.01); *G09G 2310/0297* (2013.01)

(58) Field of Classification Search
CPC ... G09G 2310/0297; G09G 2310/0281; G09G 2300/0408; G09G 2300/0426; G09G 2310/0286; G02F 1/13454; G02F 2001/133388; G02F 2201/56
See application file for complete search history.

(56) References Cited

U.S. PATENT DOCUMENTS

2008/0266210 A1* 10/2008 Nonaka .................... G09G 3/20 345/55
2012/0001835 A1* 1/2012 Yamamoto .......... G02F 1/13454 345/55
2015/0355487 A1* 12/2015 Emmert .............. G02F 1/13306 349/33

* cited by examiner

*Primary Examiner* — Dennis Joseph
(74) *Attorney, Agent, or Firm* — McClure, Qualey & Rodack, LLP

(57) ABSTRACT

Disclosed is a display apparatus, including a display region and a peripheral region outside of the display region. The display region includes a plurality of pixels arranged on a substrate. The peripheral region includes a plurality of first circuit areas and second circuit areas on the substrate. The first circuit areas drive the pixels in a first direction, and the second circuit areas drive the pixels in a second direction. At least one of the first circuit area and the second circuit area has the shape of a pentagon with sequentially connected sides including a first side, a second side, a third side, a fourth side, and a fifth side.

7 Claims, 11 Drawing Sheets

DISPLAY APPARATUS

CROSS REFERENCE TO RELATED APPLICATIONS

This application claims priority of Taiwan Patent Application No. 104105517, filed on Feb. 17, 2015, which claims the benefit of U.S. Provisional Application No. 62/082,672, filed on Nov. 21, 2014, the entirety of which are incorporated by reference herein.

BACKGROUND

Technical Field

The disclosure relates to a display apparatus, and in particular it relates to the design shape of the circuit area in the peripheral region of the display apparatus.

Description of the Related Art

A general display apparatus is rectangular and is divided into a display region and a peripheral region that is outside of the display region. The peripheral region includes a plurality of rectangular circuit areas to drive the pixels in the display region. However, the space between the rectangular circuit areas and the edge of the substrate is too large to be used appropriately in a display apparatus of another shape. In general, a circuit area with a larger area has more flexibility in its circuit design. Conventional circuit areas are usually irregular for reducing the space between the circuit area and the edge of the substrate. In addition, the circuit areas in different locations often have different shapes, such that the circuit design of some circuit areas cannot be used in other circuit areas.

Accordingly, a novel circuit-area shape is called for, in order to reduce the space between the circuit area and the edge of the substrate. Moreover, the shape of the circuit area should be suitable at any location of the peripheral region.

BRIEF SUMMARY

One embodiment of the disclosure provides a display apparatus comprising a display region including a plurality of pixels arranged on a substrate and a peripheral region outside of the display region. The peripheral region includes a plurality of first circuit areas and second circuit areas on the substrate, the first circuit areas drive the pixels in a first direction, and the second circuit areas drive the pixels in a second direction. At least one of the first circuit areas and the second circuit areas has a shape like a pentagon with sequentially connected sides including a first side, a second side, a third side, a fourth side, and a fifth side. The first side of the pentagon is parallel with the second direction. The second side of the pentagon is parallel with the first direction. The third side of the pentagon is parallel with a diagonal in one of the pixels. The fourth side of the pentagon is substantially parallel with an edge of the substrate corresponding to the pentagon, and the fourth side of the pentagon has a length that is greater than at least one side of the pixels. The fifth side of the pentagon is parallel with the third side of the pentagon.

One embodiment of the disclosure provides a display apparatus, comprising a display region including a plurality of pixels arranged on a substrate and a peripheral region outside of the display region. The peripheral region includes a plurality of first circuit areas and second circuit areas on the substrate, the first circuit areas drive the pixels in a first direction, and the second circuit areas drive the pixels in a second direction. At least one of the first circuit areas and the second circuit areas has the shape of a heptagon with sequentially connected sides including a first side, a second side, a third side, a fourth side, a fifth side, a sixth side, and a seventh side. The first side of the heptagon is parallel with the second direction. The second side of the heptagon is parallel with the first direction. The fourth side of the heptagon is parallel with an edge of the substrate corresponding to the heptagon, and the fourth side of the heptagon has a length that is greater than at least one side of the pixels. The sixth side of the heptagon is parallel with the first side of the heptagon. The seventh side of the heptagon is parallel with the second side of the heptagon.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
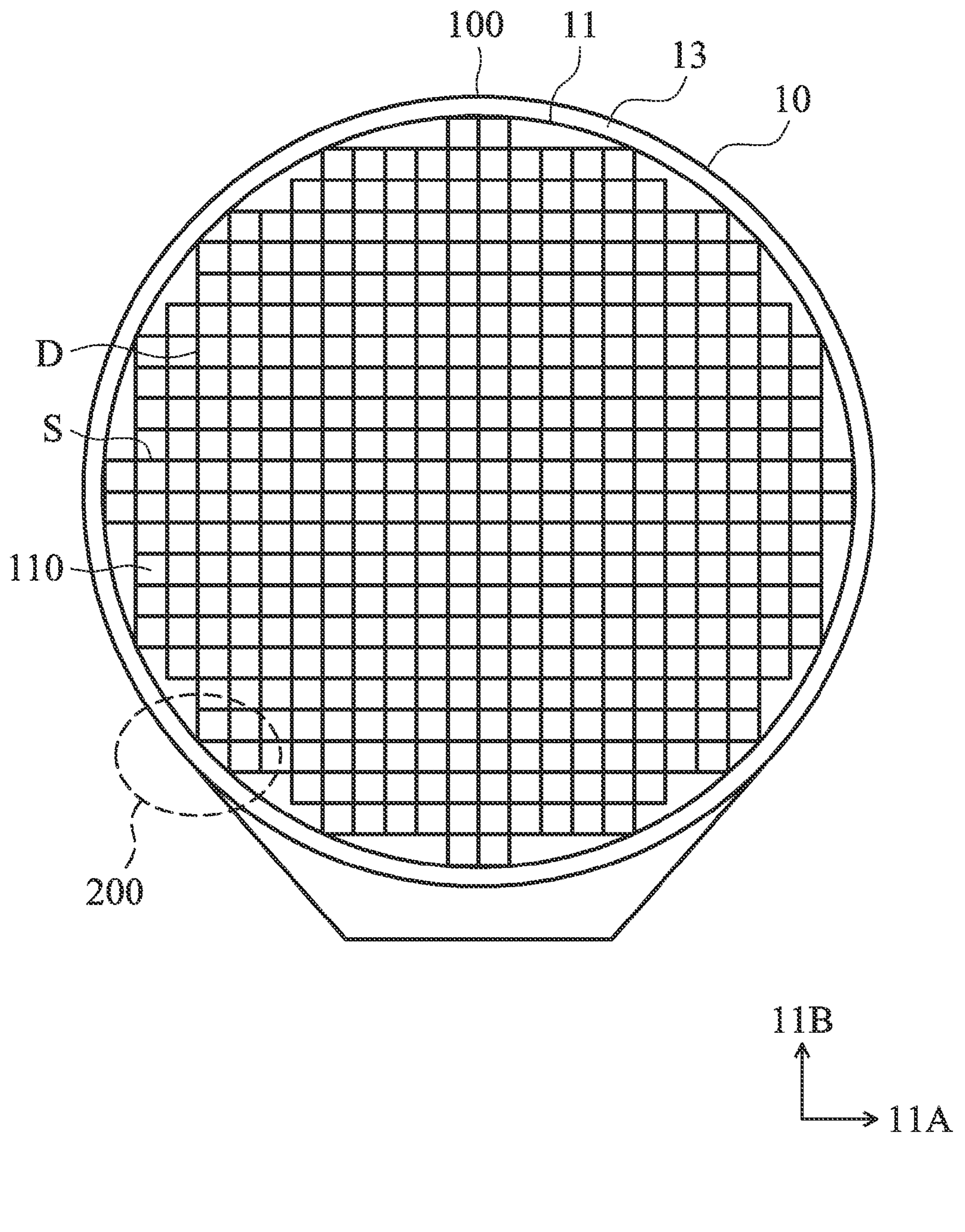
FIG. 1 shows a display apparatus in one embodiment of the disclosure.

FIG. 1 shows a display apparatus of the disclosure. The display apparatus 100 includes a substrate with a circular edge, and the substrate can be divided to a display region 11 and a peripheral region 13. The display region 11 includes pixels 110 on the substrate 10. In one embodiment, the pixels 110 have a square shape, and the first direction 11A is vertical to the second direction 11B. Alternately, the pixels may have a hexagonal shape, and there may be an angle of 60° between the first direction 11A and the second direction 11B.

The peripheral region 13 has a plurality of first circuit areas 131 and second circuit areas 133 on the substrate 10. The first circuit areas 131 drive the pixels 110 in the first direction 11A, and the second circuit areas 133 drive the pixels 110 in the second direction 11B. For example, the first circuit areas 131 can be shift registers (SR), and the single first circuit area 131 only drives pixels 110 in a single row and connects to a scan line S thereof. The second circuit areas 133 can be switches of a multiplex controller (MUX switch), and the single second circuit area 133 drives the pixels 110 in at least one column and connects to a data line D thereof.

Figure 2:
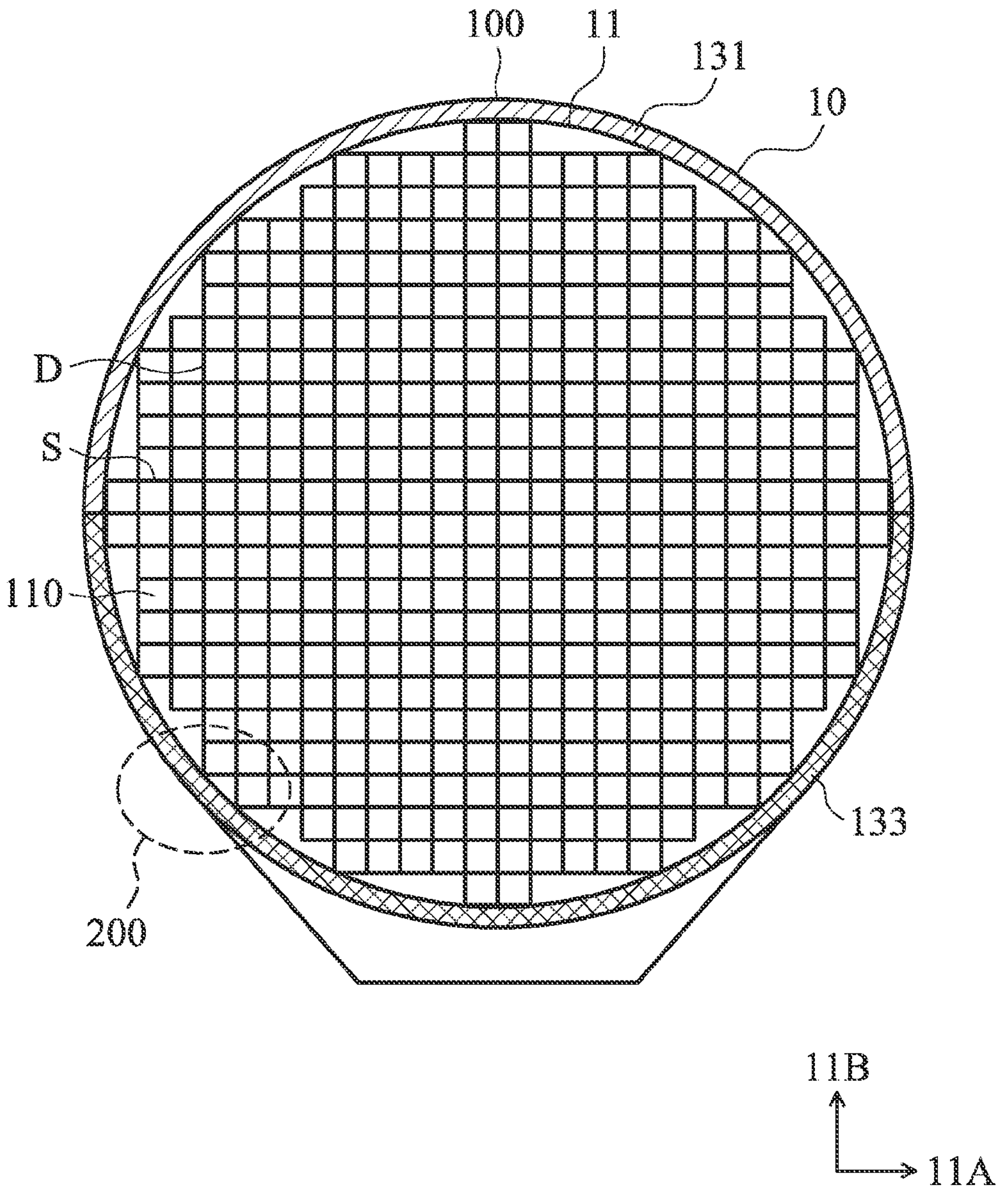
FIGS. 2 and 3 show a distribution diagram of first and second circuit areas in embodiments of the disclosure.
Figure 3:
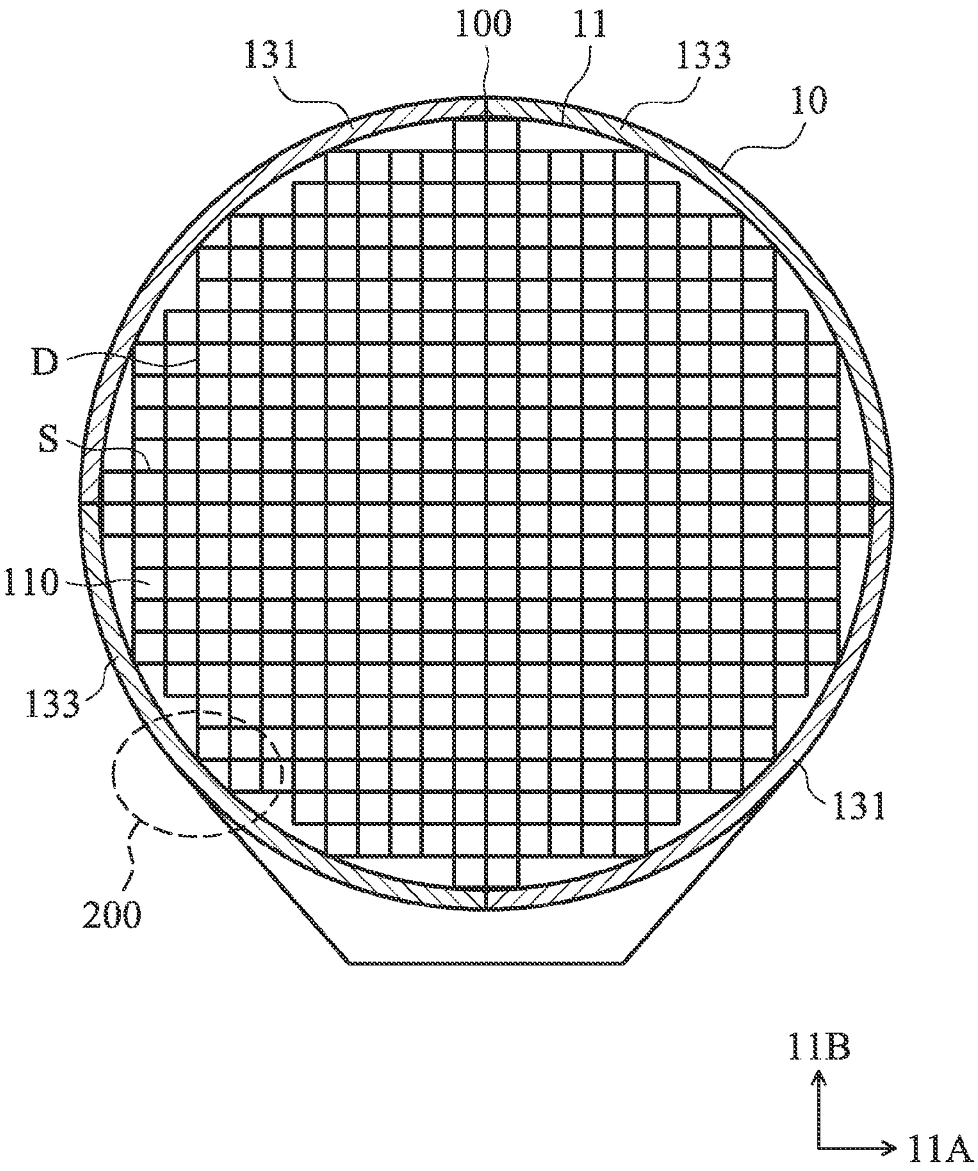

The first circuit areas 131 and the second areas 133 in the peripheral region 13 in FIG. 1 can be distributed as shown in FIGS. 2 and 3. In FIG. 2, a part of the peripheral region 13 includes both of the first circuit areas 131 and the second circuit areas 133. In FIG. 3, a part of the peripheral region 13 only includes the first circuit areas 131, and another part of the peripheral region 13 only includes the second circuit areas 133.

Figure 4:
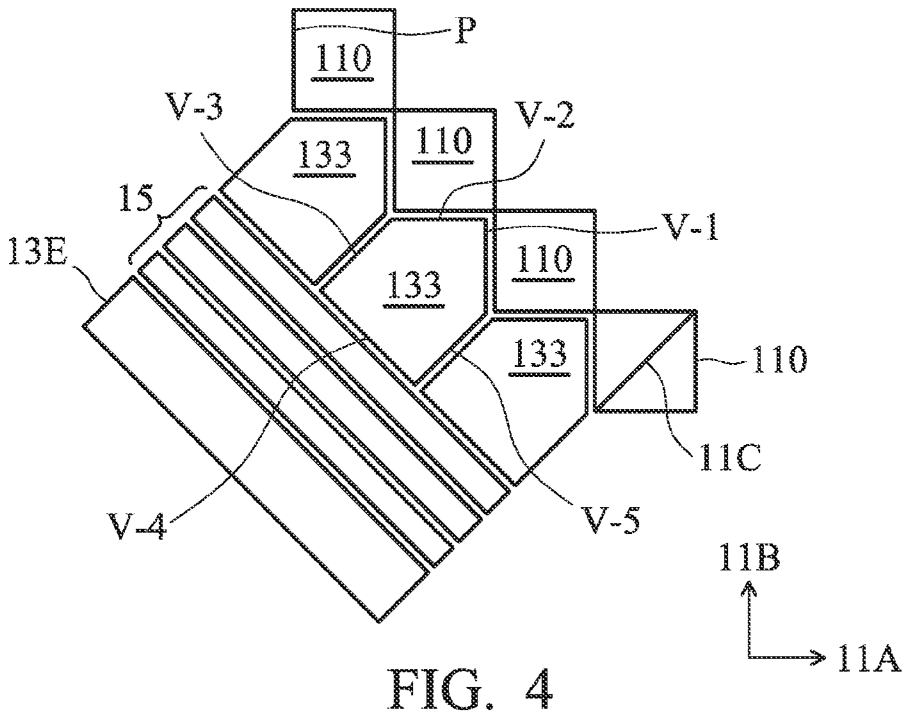
FIGS. 4 to 9 show the shapes of the first and second circuit areas in embodiments of the disclosure.

FIG. 4 is an enlargement of region 200 in FIG. 1, which illustrates the shape of the first circuit areas 131 and the second circuit areas 133 in the design of FIG. 3. It should be understood that the bottom left corner in FIG. 3 is the second circuit area 133, but the shape of the design of the second circuit areas 133 can also be used for the first circuit areas 131 in the bottom right corner.

As shown in FIG. 4, each of the pixels 110 includes three sub-pixels (R, G, and B). It should be understood that the pixels 110 may include more sub-pixels and are not limited to the general design of three sub-pixels. Moreover, the arrangements and areas of the three sub-pixels can be modified on the basis of requirement. In FIG. 4, the second circuit area 133 is shaped like a pentagon. For example of the middle second circuit area 133, the pentagon includes sequentially connected sides, such as a first side V-1, a second side V-2, a third side V-3, a fourth side V-4, and a fifth side V-5. The first side V-1 is parallel with the second direction 11B, the second side V-2 is parallel with the first direction 11A, and the third side V-3 is parallel with the diagonal 11C of the pixel 110. The fourth side V-4 of the pentagon is substantially parallel with the edge 13E of the substrate 13 corresponding to the pentagon, and the fourth side V-4 of the pentagon has a length that is greater than at least one side of the pixel 110. For example, the fourth side V-4 is greater than the right side, the left side, the top side, or the bottom side of the pixels 110. The fifth side V-5 is parallel with the third side V-3. In one embodiment, traces 15 can be disposed between the second circuit area 133 and the edge 13E of the substrate 13 for connecting different second circuit areas 133 to an external circuit. As shown in the illustrated embodiment in FIG. 4, the first side V-1 is adjacent to a side of one of the outermost pixels 110 (e.g. the left side of the pixel 110 located at the right of the second circuit area 133) in the display region 11, and the second side V-2 is adjacent to a side of another one of the outermost pixels 110 (e.g. the bottom side of the pixel 110 located at the top of the circuit area 133) in the display region 11.

Figure 5:
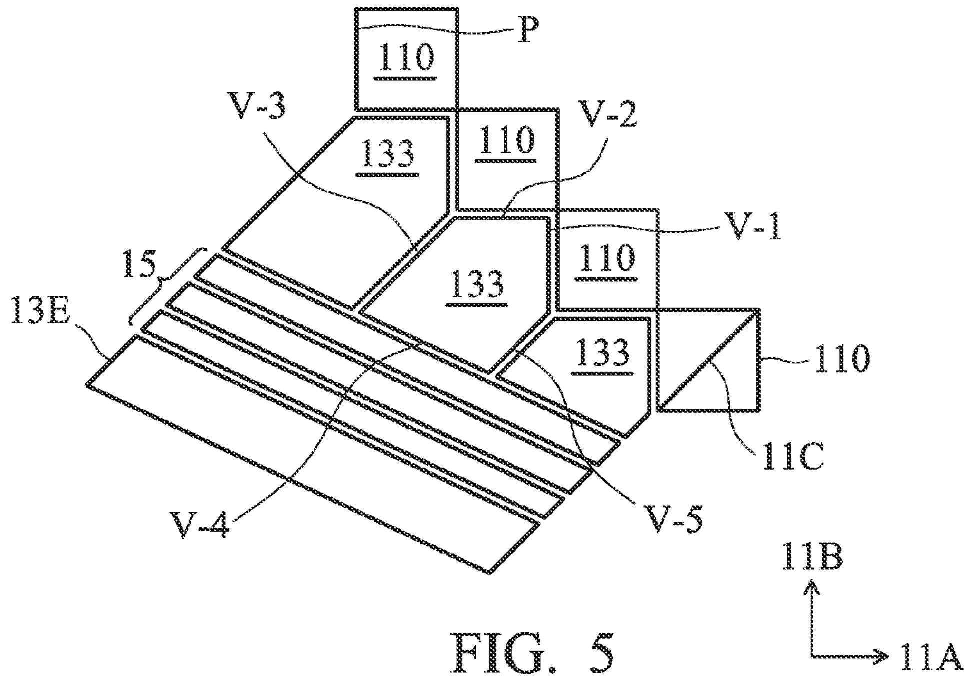

In FIG. 4, the third side V-3 and the fifth side V-5 have the same length. Alternately, the third side V-3 and the fifth side V-5 may have different lengths, such that the fourth side V-4 is substantially parallel with the edge 13E of the substrate 13 in different locations as shown in FIG. 5. Similarly, the first side V-1 and the second side V-2 may have same or different lengths, which are determined by the number of the pixels corresponding to the pentagon. It should be further explained that the edge 13E of the substrate 13 is circular from a macroscopic view, but the edge 13E of the substrate 13 corresponding to the second circuit area 133 can be constructed to be linear from a microscopic view (i.e. pixel dimensions).

Figure 6:
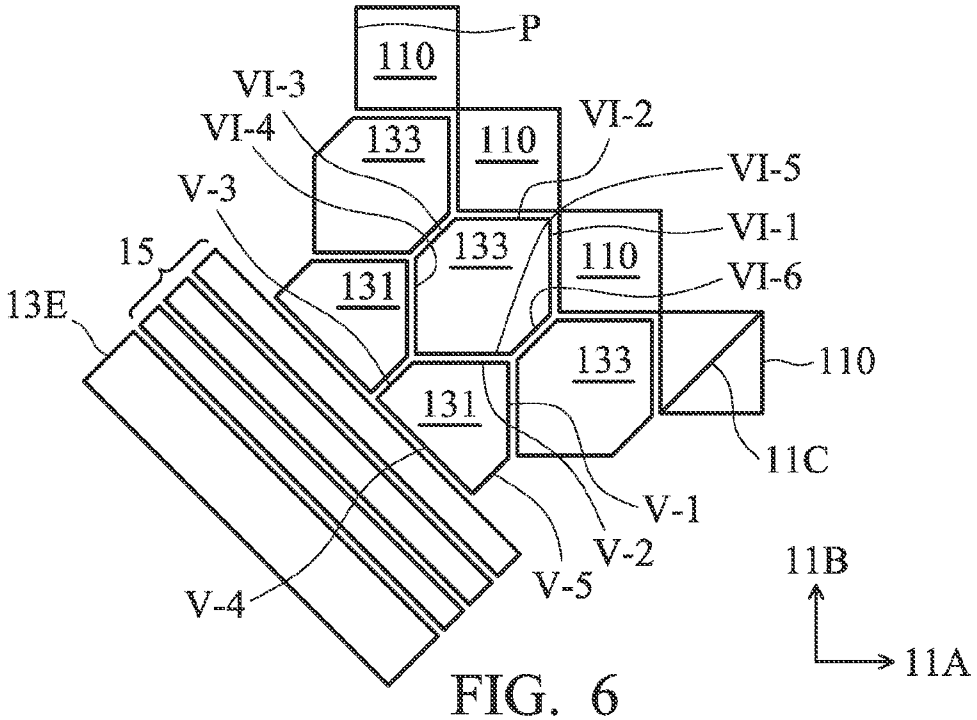

FIG. 6 is an enlargement of region 200 in FIG. 1, which illustrates the shapes of the first circuit areas 131 and the second circuit areas 133 that are disposed in the same part of the peripheral region 13 (i.e. the bottom part) in the design of FIG. 2. In a part of the peripheral region 13 (i.e. the top part) only including the first circuit areas 131, the described design of the pentagon shape can be utilized. It should be understood that the design of FIG. 6 corresponds to the bottom left part of the peripheral region 13 including both of the first circuit areas 131 and the second circuit areas 133, but the design can also be utilized in the bottom right part of the peripheral region 13 including both of the first circuit areas 131 and the second circuit areas 133. Alternately, a part of the peripheral region 13 including the first circuit areas 131 and the second circuit areas 133 can be located someplace other than at the bottom part of the peripheral region 13, but the design of FIG. 6 also works.

In FIG. 6, the second circuit area 133 is located between the first circuit area 131 and the display region 11. The first circuit area 131 with a pentagonal shape includes sequentially connected sides, such as a first side V-1, a second side V-2, a third side V-3, a fourth side V-4, and a fifth side V-5. The first side V-1 is parallel with the second direction 11B, the second side V-2 is parallel with the first direction 11A, and the third side V-3 is parallel with the diagonal 11C of the pixel 110. The fourth side V-4 of the pentagon is substantially parallel with the edge 13E of the substrate 13 corresponding to the pentagon, and the fourth side V-4 of the pentagon has a length that is greater than at least one side of one of the pixels 110. For example, the fourth side V-4 is greater than the right side, the left side, the top side, or the bottom side of the pixel 110. The fifth side V-5 is parallel with the third side V-3. In one embodiment, traces 15 can be disposed between the first circuit area 131 and the edge 13E of the substrate 13 for connecting different first circuit areas 131 to an external circuit.

As shown in FIG. 6, the second circuit area 133 with a hexagonal shape includes sequentially connected sides, such as a first side VI-1, a second side VI-2, a third side VI-3, a fourth side VI-4, a fifth side VI-5, and a sixth side VI-6. The first side VI-1 is parallel with the second direction 11B and adjacent to a side of one of the outermost pixels 110 (e.g. the left side of the pixel 110 located at the right of the second circuit area 133) in the display region 11. The second side VI-2 is parallel with the first direction 11A and adjacent to a side of another one of the outermost pixels 110 (e.g. the bottom side of the pixel 110 located at the top of the circuit area 133) in the display region 11. The third side VI-3 is parallel with the diagonal 11C of the pixel 110. The fourth side VI-4 is parallel with the first side VI-1 and adjacent to the first side V-1 of the first circuit area 131 with a pentagon shape (located at the left of the second circuit area 133). The fifth side VI-5 is parallel with the second side VI-2 and adjacent to the second side V-2 of the first circuit area 131 with a pentagon shape (located at the bottom of the second circuit area 133). The sixth side VI-6 is parallel with the third side VI-3.

Figure 7:
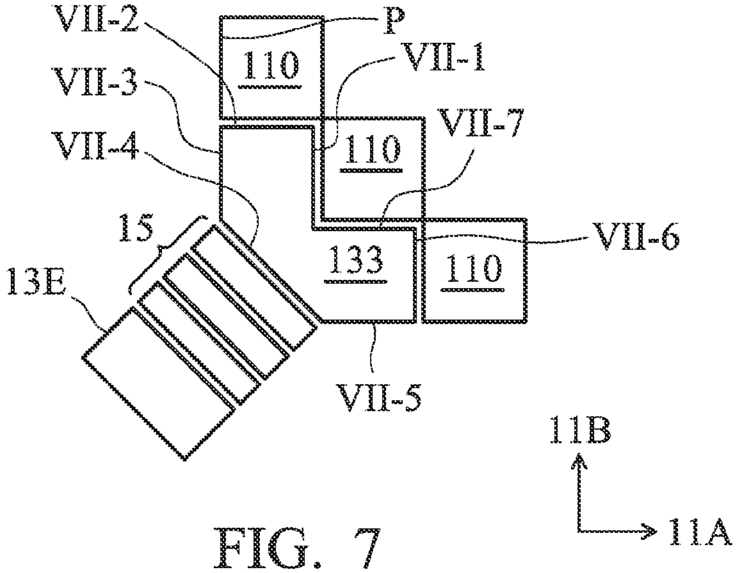

FIG. 7 is an enlargement of region 200 in FIG. 1, which illustrates the shape of the first circuit areas 131 and the second circuit areas 133 in the design of FIG. 3. It should be understood that the bottom left corner in FIG. 7 is the second circuit area 133, but the shape of the design of the second circuit areas 133 can also be used for the first circuit areas 131 in the bottom right corner.

As shown in FIG. 7, the second circuit area 133 has the shape of a heptagon including sequentially connected sides, such as a first side VII-1, a second side VII-2, a third side VII-3, a fourth side VII-4, a fifth side VII-5, a sixth side VII-6, and a seventh side VII-7. The first side VII-1 is parallel with the second direction 11B and adjacent to a first side of a first one of the outermost pixels 110 (e.g. the left side of the middle pixel 110 in FIG. 7) in the display region 11. The second side VII-2 is parallel with the first direction 11A and adjacent to a side of a second one of the outermost pixels 110 (e.g. the bottom side of the top pixel 110 in FIG. 7) in the display region 11. The fourth side VII-4 is substantially parallel with the edge 13E of the substrate 13 corresponding to the heptagon, and the fourth side VII-4 has a length that is greater than at least one side P of one of the pixels 110. For example, the fourth side VII-4 is greater than the right side, the left side, the top side, or the bottom side of the pixel 110. The sixth side VII-6 is parallel with the first side VII-1 and adjacent to a side of a third one of the outermost pixels 110 (e.g. the left side of the bottom pixel 110 in FIG. 7) in the display region 11. The seventh side VII-7 is parallel with the second side VII-2 and adjacent to a second side of the first one of the outermost pixels 110 (e.g. the bottom side of the middle pixel 110 in FIG. 7) in the display region 11. In one embodiment, traces 15 can be disposed between the second circuit areas 133 and the edge 13E of the substrate 13 to connect different second circuit areas 133 to an external circuit.

Figure 8:
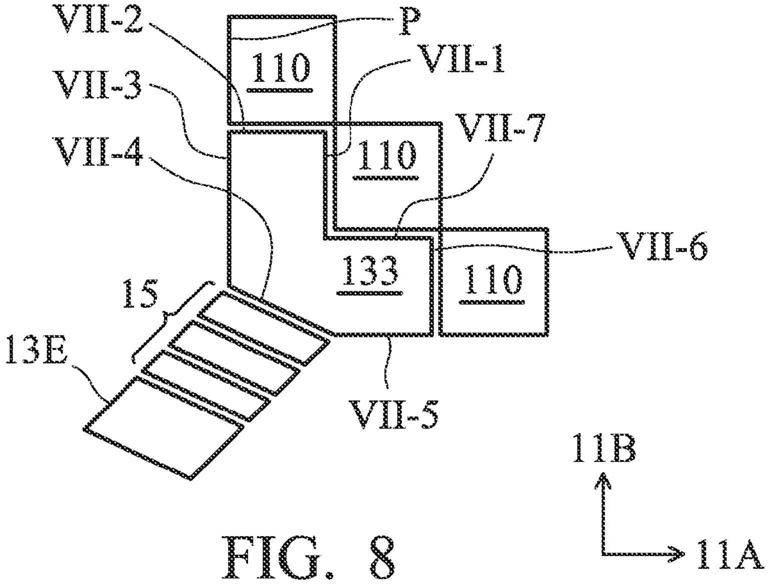

In FIG. 7, the lengths of the third side VII-3 and the fifth side VII-5 can be modified, such that the fourth side VII-4 is substantially parallel with the edge 13E of the substrate 13 in different locations as shown in FIG. 8. Similarly, the first side VII-1, the second side VII-2, the sixth side VII-6, and the seventh side VII-7 may have same or different lengths, which are determined by the number of the pixels corresponding to the heptagon. It should be further explained that the edge 13E of the substrate 13 is circular from a macroscopic view, but the edge 13E of the substrate 13 corresponding to the second circuit area 133 can be constructed to be linear from a microscopic view (i.e. pixel dimensions).

Figure 9:
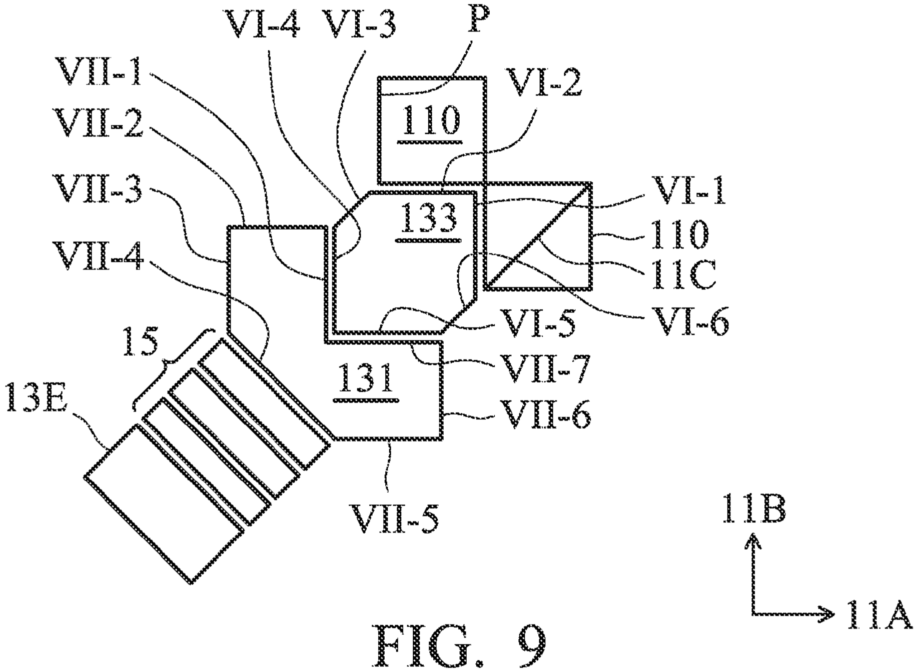

FIG. 9 is an enlargement of region 200 in FIG. 1, which illustrates the shapes of the first circuit areas 131 and the second circuit areas 133 that are disposed in the same part of the peripheral region 13 (i.e. the bottom part) in the design of FIG. 2. In a part of the peripheral region 13 (i.e. the top part) only including the first circuit areas 131, the described design of the pentagon shape can be utilized. It should be understood that the design of FIG. 9 corresponds to the bottom left part of the peripheral region 13 including both of the first circuit areas 131 and the second circuit areas 133, but the design can also be utilized in the bottom right part of the peripheral region 13 including both of the first circuit areas 131 and the second circuit areas 133. Alternately, a part of the peripheral region 13 including the first circuit areas 131 and the second circuit areas 133 can be located someplace other than at the bottom part of the peripheral region 13, but the design of FIG. 9 also works.

In FIG. 9, the second circuit area 133 is located between the first circuit area 131 and the display region 11. The first circuit area 131 has a shape like a heptagon including sequentially connected sides, such as a first side VII-1, a second side VII-2, a third side VII-3, a fourth side VII-4, a fifth side VII-5, a sixth side VII-6, and a seventh side VII-7. The first side VII-1 is parallel with the second direction 11B. The second side VII-2 is parallel with the first direction 11A. The fourth side VII-4 is substantially parallel with the edge 13E of the substrate 13 corresponding to the heptagon, and the fourth side VII-4 has a length that is greater than at least one side P of one of the pixels 110. For example, the fourth side VII-4 is greater than the right side, the left side, the top side, or the bottom side of the pixel 110. The sixth side VII-6 is parallel with the first side VII-1. The seventh side VII-7 is parallel with the second side VII-2. In one embodiment, traces 15 can be disposed between the first circuit areas 131 and the edge 13E of the substrate 13 to connect different first circuit areas 131 to an external circuit.

As shown in FIG. 9, the second circuit area 133 with a hexagonal shape includes sequentially connected sides, such as a first side VI-1, a second side VI-2, a third side VI-3, a fourth side VI-4, a fifth side VI-5, and a sixth side VI-6. The first side VI-1 is parallel with the second direction 11B and adjacent to a side of one of the outermost pixels 110 (e.g. the left side of the pixel 110 located at the right of the second circuit area 133) in the display region 11. The second side VI-2 is parallel with the first direction 11A and adjacent to a side of another one of the outermost pixels 110 (e.g. the bottom side of the pixel 110 located at the top of the second circuit area 133) in the display region 11. The third side VI-3 is parallel with the diagonal 11C of the pixel 110. The fourth side VI-4 is parallel with the first side VI-1 and adjacent to the first side VII-1 of the first circuit area 131 with a heptagon shape. The fifth side VI-5 is parallel with the second side VI-2 and adjacent to the seventh side VII-7 of the first circuit area 131 with a heptagon shape. The sixth side VI-6 is parallel with the third side VI-3.

Figure 10A:
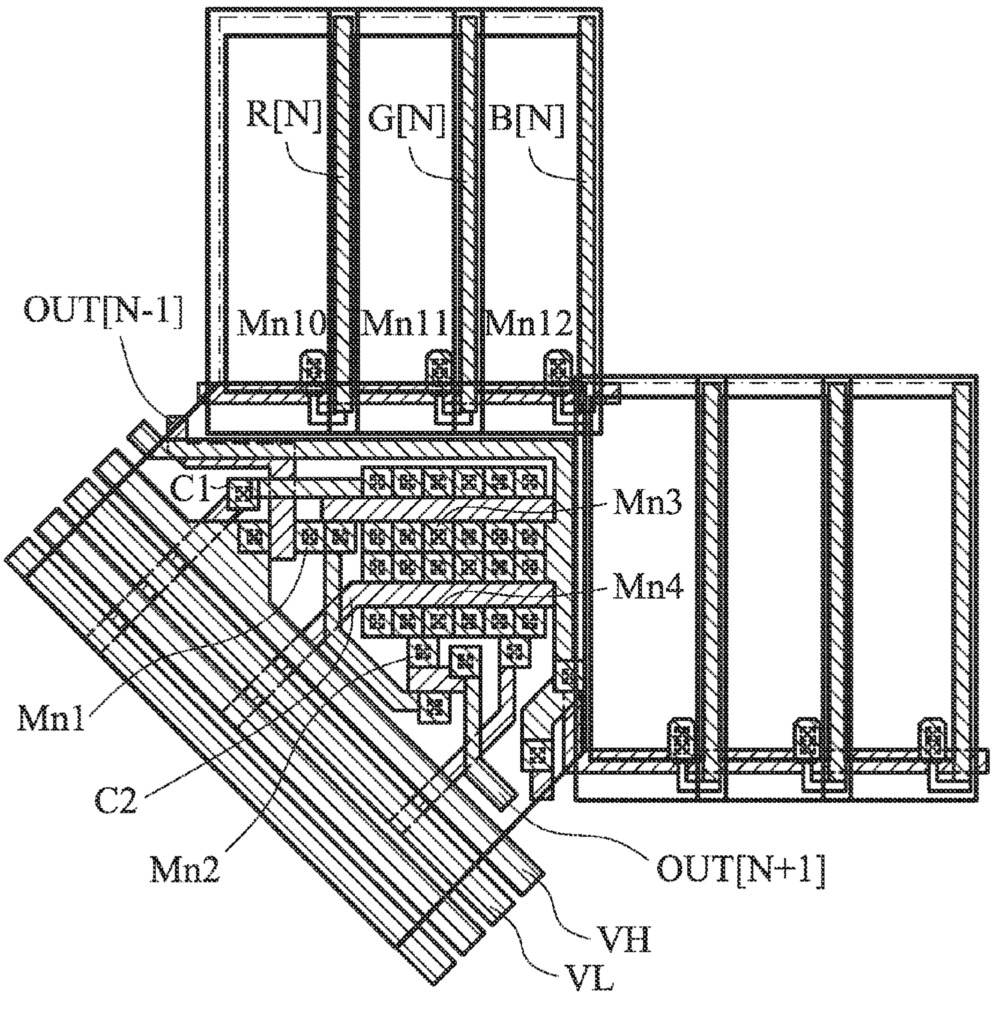
FIGS. 10A to 10D show the layouts of the first and second circuit areas in embodiments of the disclosure.
Figure 11:
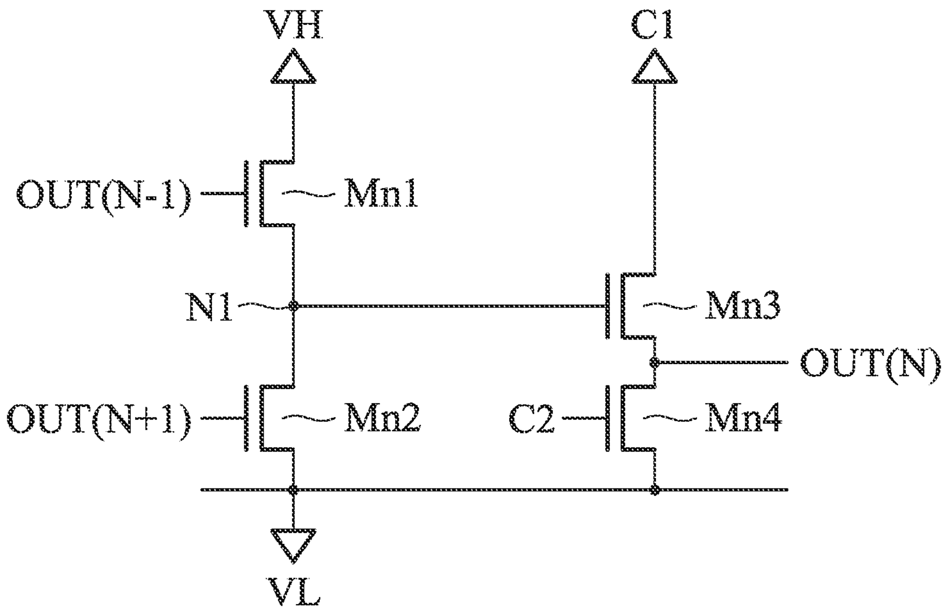
FIG. 11 shows a circuit diagram of a shift register in one embodiment of the disclosure.

In one embodiment, the first circuit area 131 is shaped like a pentagon (e.g. the design of FIG. 4 or 5) has a layout as shown in FIG. 10A, and the first circuit area 131 is a plurality of shift registers correspondingly driving a plurality of scan lines S. One of the shift registers includes power supply lines VH and VL adjacent to the fourth side V-4 of the pentagon and substantially parallel with the edge 13E of the substrate 13 corresponding to the pentagon. The shift register has a circuit diagram as shown in FIG. 11. In general, the shift register includes four transistors Mn1, Mn2, Mn3, and Mn4 to drive the gates of the pixels 110 in a single row.

Figure 10B:
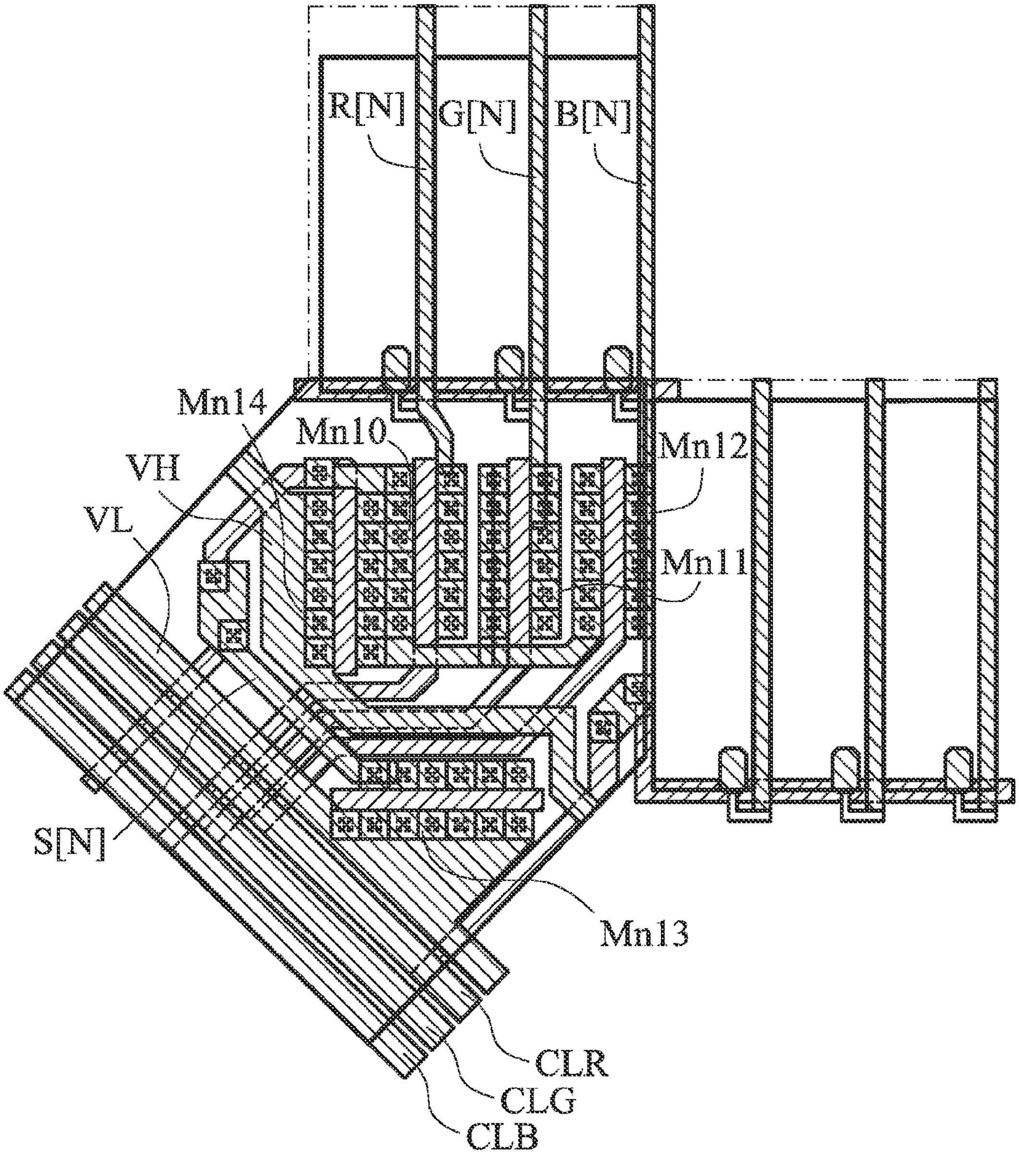
Figure 12:
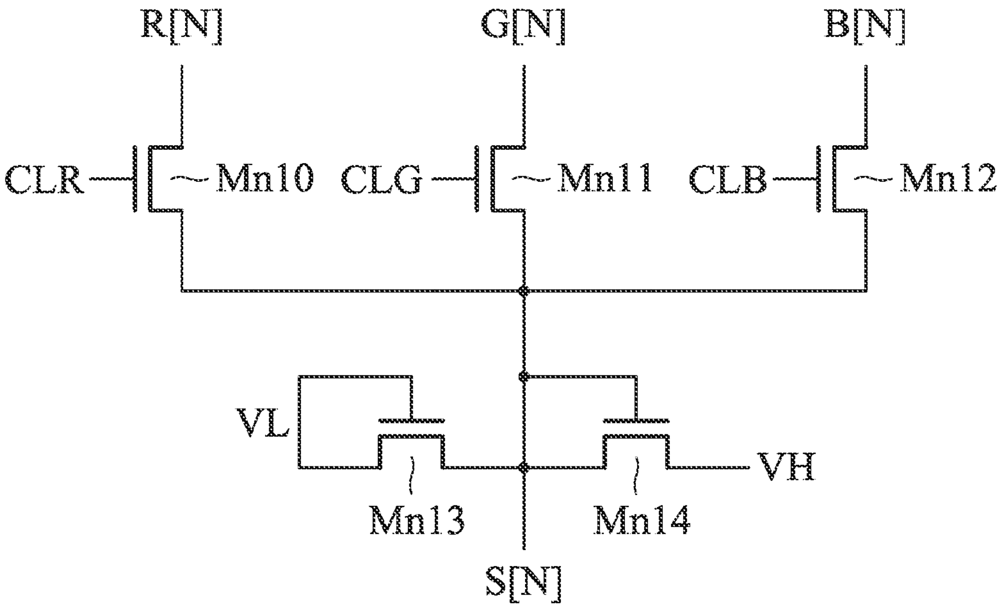
FIG. 12 shows a circuit diagram of a multiplex controller in one embodiment of the disclosure.

In one embodiment, the second circuit area 133 with a pentagonal shape (e.g. the design of FIG. 4 or 5) has a layout as shown in FIG. 10B, and the second circuit area 133 is a plurality of multiplex controllers correspondingly driving a plurality of data lines. One of the multiplex controllers includes clock signal lines CLR, CLG, and CLB adjacent to the fourth side V-4 of the pentagon and substantially parallel with the edge 13E of the substrate 13 corresponding to the pentagon. The multiplex controller has a circuit diagram as shown in FIG. 12. In general, the multiplex controller includes three transistors Mn10, Mn11, and Mn12 to switch on/off the data lines of the sub-pixels R, G, and B of the pixels 110 in a single column at different time points, respectively. If the number of the sub-pixels of the pixel 110 is more (i.e. RGBY), the number of the transistors will be more (i.e. four). In addition, the transistor Mn13 and Mn14 of the multiplex controller belong to a protection circuit for electrostatic discharge (ESD).

Figure 10C:
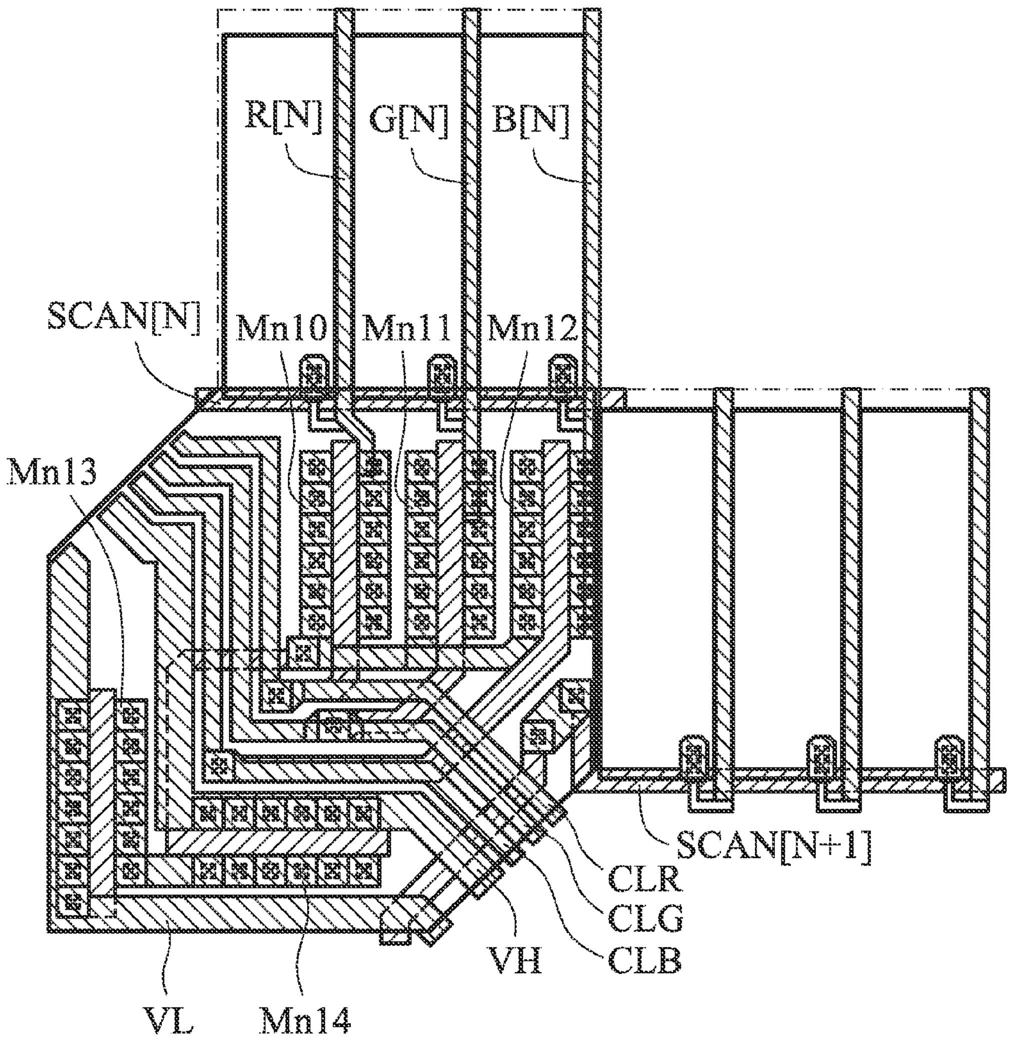

In one embodiment, the first circuit area 131 has a shape like a pentagon, the second circuit area 133 has the shape of a hexagon, and the second circuit area 133 is disposed between the first circuit area 131 and the pixels 110 (e.g. the design of FIG. 6). The first circuit area 131 is a shift register, and its layout can be referred to FIG. 10A. The second circuit area 133 is a plurality of multiplex controllers correspondingly driving a plurality of data lines, and has a layout as shown in FIG. 10C. One of the multiple controllers includes a power supply line VL adjacent to the fifth side VI-5 of the hexagon. The multiplex controller has a circuit diagram as shown in FIG. 12.

Figure 10D:
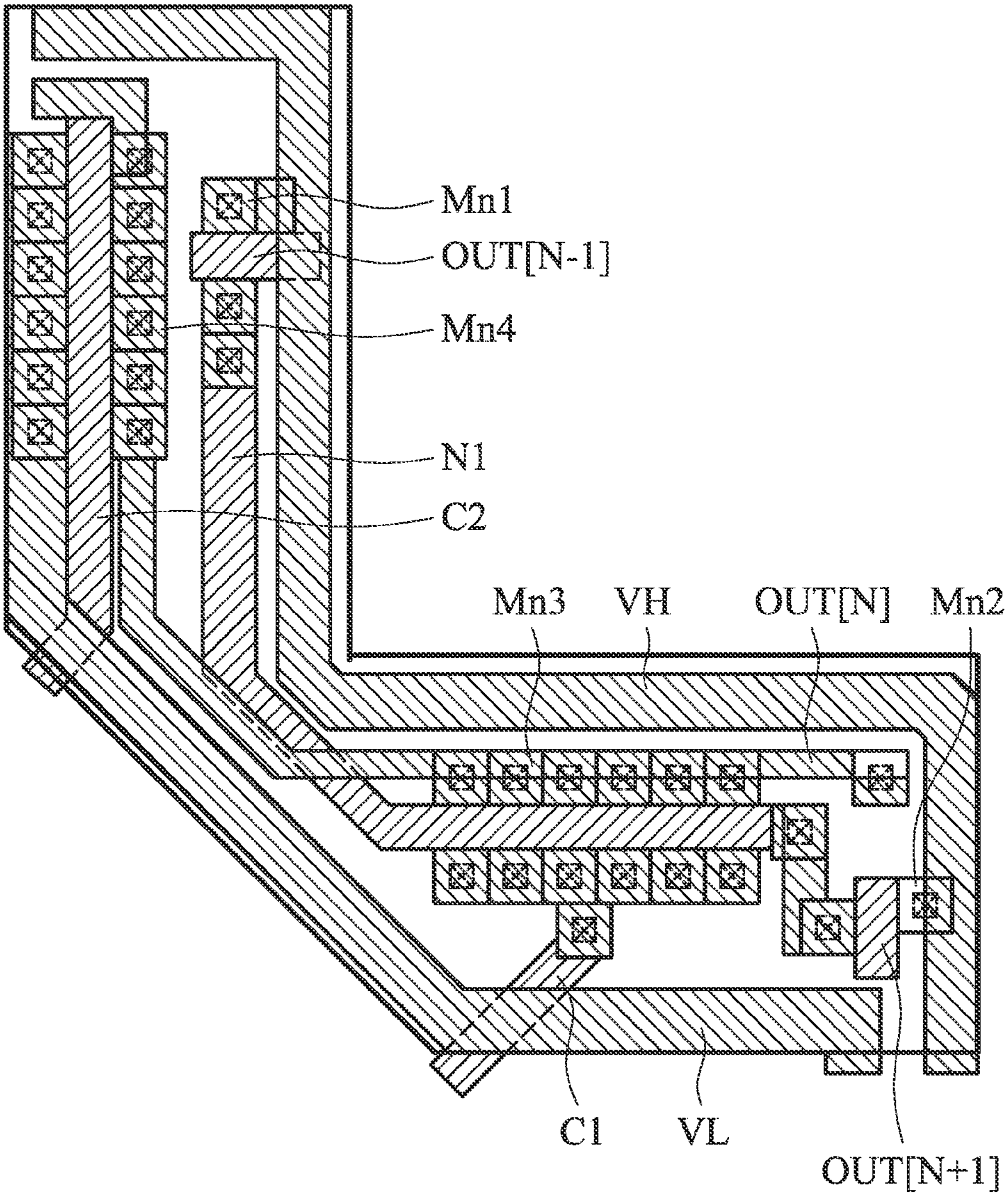

In one embodiment, the first circuit area 131 with the shape of a heptagon (e.g. the design of FIG. 7 or 8) has a layout as shown in FIG. 10D, and the first circuit area 131 is a plurality of shift registers correspondingly driving a plurality of scan lines. One of the shift registers includes a power supply line VL adjacent to the fourth side VII-4 of the heptagon and substantially parallel with the edge 13E of the substrate 13 corresponding to the heptagon. The shift register has a circuit diagram as shown in FIG. 11.

In one embodiment, the first circuit area 131 with the shape of a heptagon (e.g. the design of FIG. 7 or 8) has a layout as shown in FIG. 10D, and the first circuit area 131 is a plurality of shift registers correspondingly driving a plurality of scan lines. One of the shift registers includes a power supply line VL adjacent to the fifth side VII-5 of the heptagon. The shift register has a circuit diagram as shown in FIG. 11.

In one embodiment, the first circuit area 131 with a heptagonal shape (e.g. the design of FIG. 7 or 8) has a layout as shown in FIG. 10D, and the first circuit area 131 is a plurality of shift registers correspondingly driving a plurality of scan lines. One of the shift registers includes a power supply line VH adjacent to the first side VII-1 and the seventh side VII-7 of the heptagon. The shift register has a circuit diagram as shown in FIG. 11.

In one embodiment, the first circuit area 131 is shaped like a heptagon, the second circuit area 133 has the shape of a hexagon, and the second circuit area 133 is disposed between the first circuit area 131 and the pixels 110 (e.g. the design of FIG. 9). The first circuit area 131 is a shift register, and its layout can be referred to FIG. 10D. The second circuit area 133 is a plurality of multiplex controllers correspondingly driving a plurality of data lines. One of the multiple controllers includes a power supply line VL adjacent to the fifth side VI-5 of the hexagon. The multiplex controller has a circuit diagram as shown in FIG. 12. Note that the layouts of FIGS. 10A to 10D and the circuit diagrams of FIGS. 11 and 12 are only for illustration and not for liming the disclosure. Any layout or circuit of the shift register or the multiplex controller that may drive the pixels can be used as a layout or circuit of the first circuit area 131 or the second circuit area 133 in the disclosure.

Accordingly, the disclosure provides novel shape designs of the circuit areas, which may reduce the space between the circuit areas and the edge of the substrate. In addition, the shape of the design of the circuit areas can be used in any location of the peripheral region.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display apparatus, comprising:

a display region including a plurality of pixels arranged on a substrate; and a peripheral region outside of the display region, wherein the peripheral region includes a plurality of first circuit areas and second circuit areas on the substrate, the first circuit areas drive the pixels in a first direction, and the second circuit areas drive the pixels in a second direction;

wherein at least one of the first circuit areas and the second circuit areas has a shape of a pentagon with sequentially connected sides including a first side, a second side, a third side, a fourth side, and a fifth side, wherein the first side of the pentagon is parallel with the second direction, the second side of the pentagon is parallel with the first direction, the third side of the pentagon is parallel with a diagonal in one of the pixels, the fourth side of the pentagon is substantially parallel with an edge of the substrate corresponding to the pentagon, and the fourth side of the pentagon has a length that is greater than at least one side of one of the pixels, and the fifth side of the pentagon is parallel with the third side of the pentagon wherein another one of the first circuit areas and the second circuit areas has a shape of a hexagon disposed between the pentagon and the display region, wherein the hexagon has sequentially connected sides including a first side, a second side, a third side, a fourth side, a fifth side, and a sixth side;

wherein the first side of the hexagon is parallel with the second direction and adjacent to a side of one of the outermost pixels in the display region, the second side of the hexagon is parallel with the first direction, and adjacent to a side of another one of the outermost pixels in the display region, the third side of the hexagon is parallel with a diagonal in one of the pixels, the fourth side of the hexagon is parallel with the first side of the hexagon, and parallel with the first side of the pentagon, the fifth side of the hexagon is parallel with the second side of the hexagon, and parallel with the second side of the pentagon, and the sixth side of the hexagon is parallel with the third side of the hexagon.

2. The display apparatus as claimed in claim 1, wherein the first side of the pentagon is adjacent to a side of one of the outermost pixels in the display region, and the second side of the pentagon is adjacent to a side of another one of the outermost pixels in the display region.

3. The display apparatus as claimed in claim 1, wherein the pixels have a rectangular shape, the first direction is vertical to the second direction, each of the first circuit areas drives the pixels in a single row, and each of the second circuit areas drives the pixels in at least one column.

4. The display apparatus as claimed in claim 1, wherein the display region substantially has a circular shape.

5. The display apparatus as claimed in claim 1, wherein the first circuit areas are shift registers correspondingly driving a plurality of scan lines, and one of the shift registers includes a power supply line, wherein the power supply line is adjacent to the fourth side of the pentagon, and substantially parallel with the edge of the substrate corresponding to the pentagon.

6. The display apparatus as claimed in claim 1, wherein the second circuit areas are multiplex controllers correspondingly driving a plurality of data lines, and one of the multiplex controllers includes a clock signal line, wherein the clock signal line is adjacent to the fourth side of the pentagon, and substantially parallel with the edge of the substrate corresponding to the pentagon.

7. The display apparatus as claimed in claim 1, wherein the second circuit areas are multiplex controllers correspondingly driving a plurality of data lines, one of the multiplex controllers includes a power supply line adjacent to the fifth side of the hexagon.

* * * * *